United States Patent [19]
Yan

[11] Patent Number: 5,726,535
[45] Date of Patent: Mar. 10, 1998

[54] LED RETROLIFT LAMP FOR EXIT SIGNS

[76] Inventor: Ellis Yan, 29 Annandale Dr., South Russell, Ohio 44022

[21] Appl. No.: 630,166

[22] Filed: Apr. 10, 1996

[51] Int. Cl.$^6$ ................................................ H05B 37/00
[52] U.S. Cl. .................... 315/185 R; 315/187; 315/310; 362/800; 362/812; 362/240
[58] Field of Search ............................ 315/51, 71, 187, 315/185 R, 193, 224, 294, 310; 362/227, 234, 252, 226, 250, 240, 800, 812

[56] References Cited

U.S. PATENT DOCUMENTS

| | | | |
|---|---|---|---|
| 3,795,830 | 3/1974 | Richardson | 315/135 X |
| 4,211,955 | 7/1980 | Ray | 315/53 |
| 4,727,289 | 2/1988 | Uchida | 315/71 |
| 5,112,157 | 5/1992 | Walton et al. | 315/66 |
| 5,303,124 | 4/1994 | Wrobel | 362/20 |
| 5,416,679 | 5/1995 | Ruskouski et al. | 362/240 |
| 5,463,280 | 10/1995 | Johnson | 315/187 |
| 5,575,459 | 11/1996 | Anderson | 315/185 R X |

Primary Examiner—Robert Pascal
Assistant Examiner—Haissa Philogene
Attorney, Agent, or Firm—Joseph H. Taddeo

[57] ABSTRACT

A retrofit lamp having light emissive diodes, and more particularly, to a retrofittable lamp configured as a standard incandescent lamp which can be used effectively in illuminated signs, such as an exit sign, for operation on each cycle of A/C voltage applied. The newly designed solid-state lamp features a base that can be rotated, approximately 160 degrees, to allow for the optimal positioning of the LED array to maximize the light intensity directed toward the illuminated area.

27 Claims, 4 Drawing Sheets

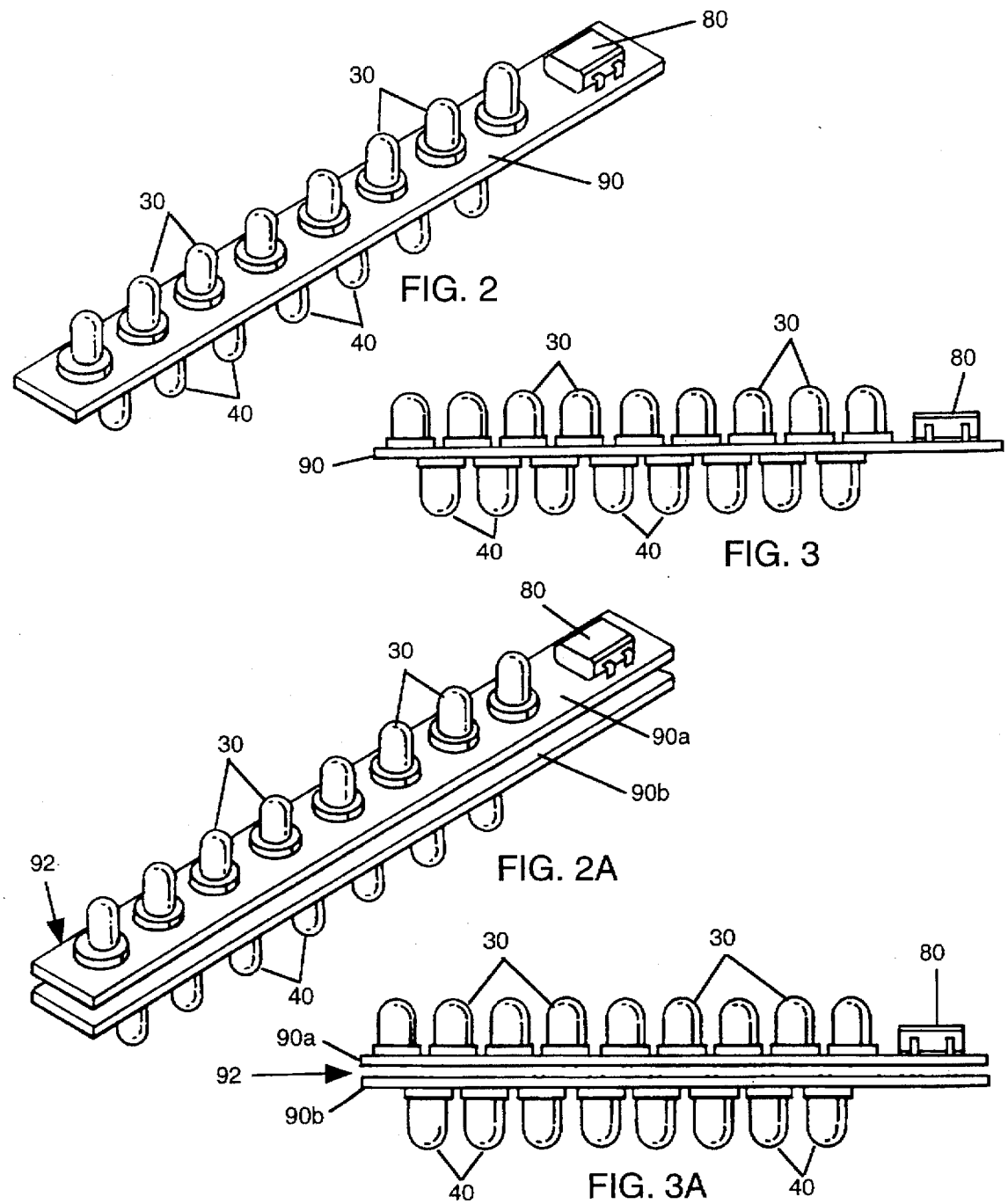

LED RETROLIFT LAMP FOR EXIT SIGNS

FIELD OF INVENTION

The present invention relates to a replacement source of illumination using light emissive diodes, and more particularly, to a retrofittable lamp that is configured as a standard incandescent lamp which can be used effectively in illuminated signs, such as an exit sign. The newly designed solid-state lamp features a base that can be rotated, approximately 160 degrees, to allow for the optimal positioning of the LED array to maximize the light intensity directed toward the illuminated area.

BACKGROUND OF THE INVENTION

Illuminated exit signs exist in numerous public and private buildings to inform patrons and residents of the location of stairwells and exits if there is a particular emergency. There are perhaps as many as 40 to 50 million exit signs in use today in this country.

While incandescent lamps are generally used in these applications, these lamps have a short life and are therefore in need of frequent replacement. Frequent inspection and maintenance add to the expense of operating the illuminated signs. These deficiencies and shortcomings were recognized, particularly by Walton, et al in U.S. Pat. Nos. 5,012,157 and 4,782,429, which contain disclosure of incandescent lamps used particularly in exit signs, wherein the low voltage incandescent lamps were intended to provide an extended service life.

One of the methods for improving the longevity of the illumination source was proposed by Ray, in U.S. Pat. No. 4,211,955 which utilizes light emitting diodes mounted within a standard incandescent light bulb and base. Ray discloses several circuit configurations utilizing integrated circuit modules to perform both full and half wave rectification, voltage regulation to provide a regulated DC source of energy to drive an array of light emissive diodes.

Another light emitting retrofit lamp was proposed by Johnson in U.S. Pat. No. 5,463,280 that uses a plurality of serially connected light emissive diodes as an illumination source for a retrofittable lamp with common incandescent bases, which is intended for use as a replacement lamp in illuminated signs such as exit signs and the like. Johnson discloses discrete circuitry that uses a reactive element, such as a capacitor, which effectively limits the current to 0.02 amperes; and a full wave bridge rectifier to rectify the alternating current voltage source.

In alternative embodiments, the current limiting device being a current limiting resistor, the rectifying element being half wave, a Movistor, more commonly known as a varistor, is used to protect against transient voltage surges, and there is added a regulated switching power regulator.

Other patents further disclose the use of light emitting diodes as an illumination source. These patents include Richardson, U.S. Pat. No. 3,795,830; U.S. Pat. No. 4,290,095, to Schmidt; U.S. Pat. No. 4,630,183 to Fujita; and, U.S. Pat. No. 4,727,289, to Uchida.

There are many disadvantages of one kind or another as shown in prior art. Because of these and other disadvantages and limitations, their use has been reduced in many applications.

These impediments can be overcome by the present invention that will be disclosed in the following paragraphs. What is needed is an improved retrofittable lamp that uses fewer components to attain a cost effective design which is more rugged in use, achieves a long-lasting performance without degradation, is efficient in performance and is less expensive to manufacture. In this regard, this invention fulfills this need.

SUMMARY OF THE INVENTION

The present invention provides for a retrofittable replacement lamp that uses an array of light emissive diodes as a source of illumination in lieu of the presently available incandescent bulbs whose glass envelope is fitted into a conventional lamp base. The resulting lamp is used to replace the present incandescent illumination sources that are found in exit signs and the like.

The base is the same styled screw base that is commonly found on standard incandescent bulbs. This newly designed lamp merely screws into an existing mating socket that has the same operating voltage.

Mounted into the confines of a glass envelope is a dual sided printed circuit board assembly upon which are mounted two serially connected light emitting diode arrays. There are approximately 12 LED's mounted on each side of the printed circuit board; giving a total of 24 LED's.

Because the light dispersion angle is about 90 degrees, the source of illumination is likened to two cones of light which emanate from each pair of oppositely disposed LED's. To maximize the illumination intensity, the linear columnar array of diodes mounted to the printed circuit board can be positioned into an optimal viewing position by rotating the base that is cemented to the glass that envelopes the diode array. Two tabs that extend from the base mate with a plastic insert that attaches to the base assembly. The printed circuit assembly can now be positioned so that it is orthogonal to the front surface of the exit sign. Once positioned in its correct and desired position, it is locked into position by giving a slight rotation to the glass envelope with reference to its base.

The circuit that provides the source of illumination consists of a serial array of 12 LED's connected in series with a half wave rectifier. Connected in parallel to this first array is another array of serially connected LED's, again in series with a second half wave rectifier. The manner in which the two serial arrays are connected is such that the first array conducts in the opposite direction of the second array.

A capacitor is used as a reactive impedance to act as a current limiting source to the two LED arrays that are connected in parallel. A varistor provides the additional transient suppression to protect the LED lamps from a transient surge especially when the lamp is first turned on.

It is therefore an object of the present invention to provide for a solid-state high intensity source of illumination for use principally in exit signs, and the like, as a retrofit for presently available incandescent lamps.

It is another object of this invention to provide for a solid-state high intensity source of illumination has improved reliability by eliminating lamps that have an unreliable filament structure.

It is still another object of this invention to provide for a solid-state high intensity source of illumination that has greater efficiency thereby reducing the operating costs by having a greater life expectancy for the lamps and by eliminating as many dissipative elements within the circuit of each lamp.

It is yet another object of this invention to provide for a solid-state high intensity source of illumination that can be positioned optimally by a locking feature embodied by the glass envelope being locked to the base.

It is the final object of this invention to provide for a solid-state high intensity source of illumination that can be manufactured at a substantially reduced cost.

Other objects and features of this invention will be apparent in part and so indicated hereinafter. Further advantages will be apparent to those of ordinary skill in the art upon reading and understanding the following detailed description.

BRIEF DESCRIPTION OF THE DRAWINGS

FIG. 2 is a perspective view of the preferred arrangement of the light emitting diodes as they are positioned on a dual sided printed circuit board.

FIG. 2A is a perspective of the circuit board made in two pieces to facilitate wave soldering the LEDs and the pieces adhered together.

FIG. 3 is a side elevation of the dual sided printed circuit board assembly depicting the arrangement shown in FIG. 2.

FIG. 3A is a side view of the circuit board assembly of FIG. 3, wherein the board is made in two pieces to facilitate wave soldering the LEDs and the pieces adhered together.

DETAILED DESCRIPTION OF THE PREFERRED EMBODIMENT

The newly designed solid-state lamp serves as a replacement source of illumination using light emissive diodes, designed as a retrofittable lamp configured as a standard incandescent lamp, which can be used efficiently in illuminated signs, such as an exit sign.

Figure 1:
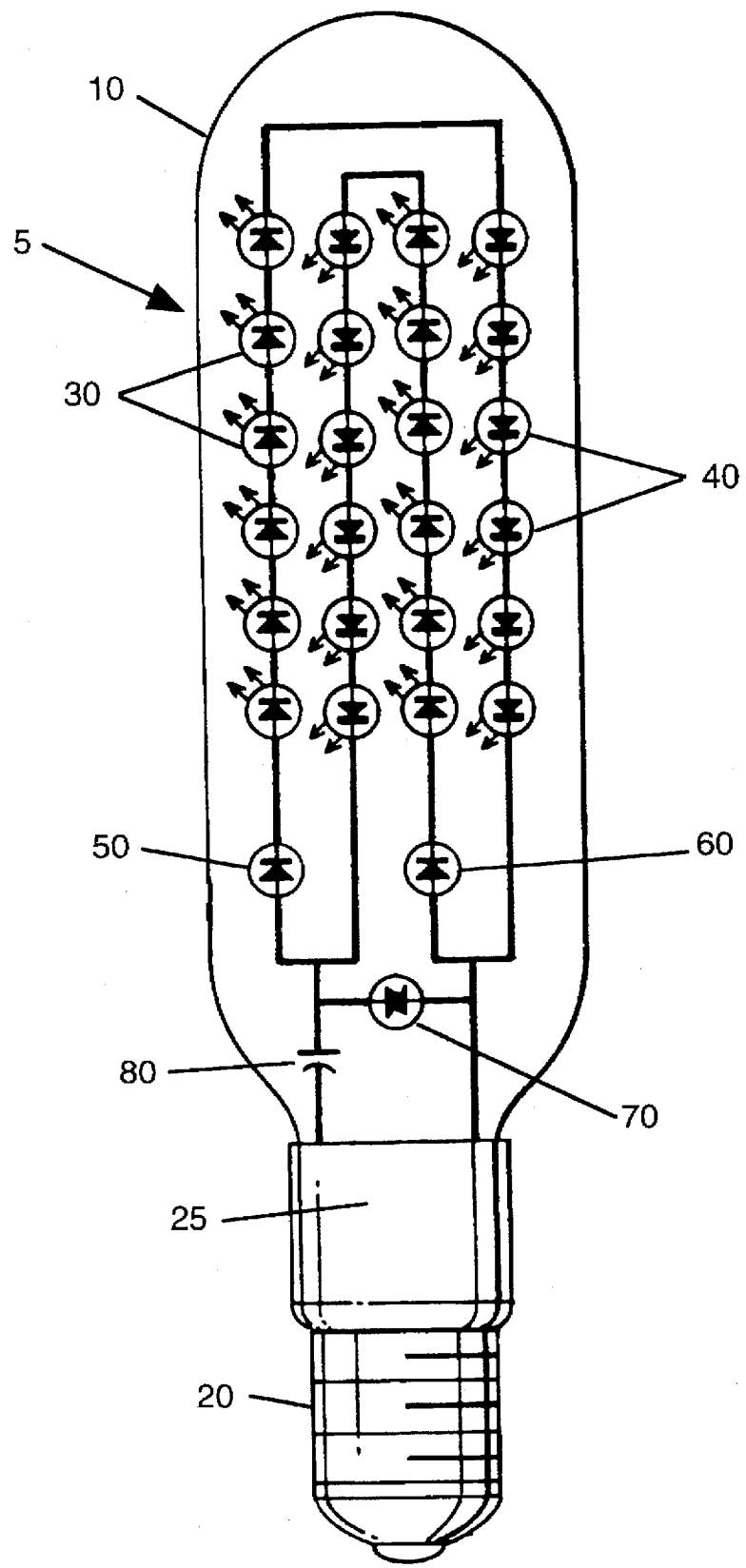
FIG. 1 is a cross-sectional view of the preferred embodiment of the lamp according described in this invention, where the interior circuitry is depicted schematically.

Referring now to FIG. 1, the present invention 5 in its preferred embodiment is illustrated as comprising a cylindrical glass envelope 10, which surrounds the associated circuitry found internally within the structure of the newly designed solid-state lamp and the lamp base 20. Intermediate to the glass housing 10 and the candelabra base 20 is a newly designed rotational base that allows the lamp to be positioned for optimal illumination.

A plurality of LEDs is arranged in two serially connected strings, 30 and 40, where each string is connected through its individual half-wave rectifier, namely 50 and 60 respectively. Each of the two serial strings is connected in parallel with each other, in such a manner that when the first string is conducting on the positive half of the cycle of the applied voltage, the second string is in a nonconductive state. Conversely, on the negative half of the cycle of the applied voltage, when the second string is conducting, the first string is nonconductive.

The two parallel arrays of serially connected LEDs are connected in series with capacitor 80. The capacitor 80 is used as a nondissipative voltage dropping element for the parallel arrangement of the serially connected diode arrays. The capacitive reactance is calculated as:

$$X_c = \frac{1}{2\pi f C}$$

where:
$X_c$=capacitive reactance in ohms
f=frequency in hertz
C=capacitance in farads Although a resistive dropping element could be used in place of the capacitor, it does not yield an efficient circuit performance. For example, this resistor will dissipate an added 1 watt when there is 10 milliamperes flowing through it. Therefore in the preferred embodiment, a capacitor is used as the voltage dropping impedance, which will give a leading power factor while reducing the power consumption, thereby yielding a higher efficiency.

Considering that the forward voltage drop of each LED is typically 2 volts, the total instantaneous voltage drop across the ensemble of 12 LEDs is 24 volts. With the replacement lamp connected to a voltage source of 117 volts rms, the remaining voltage of approximately 93 volts appears across the capacitor.

When power is first applied to the replacement lamp, the maximum instantaneous value of current is not limited by any current limiting element, hence the inrush current could seriously damage the LEDs. To protect the LED arrays from this eventuality, voltage variable resistor 70 is added in parallel with the LED arrays.

Turning now to FIG. 2 and FIG. 3, shown is the light stick comprised of LED arrays 30 and 40 as mounted to the dual sided printed circuit board 90. LEDs 30 are mounted to the upper surface and LEDs 40, to the lower surface. The circuit board 90 preferably retains several semiconductor chips (not shown) which are embedded in the circuit board. As such, the board 90 is more preferably to constructed of an electrically insulating encapsulating material for maintenance of isolation between the chips.

Reference to FIG. 3A and FIG. 3B, indicates that most preferably, the board 90 would be manufactured in two pieces 90A and 90B, to expedite wave soldering the LEDs on a board surface, whereupon the board pieces or halves are then adhered together to form light stick 92 as shown.

Figure 9:
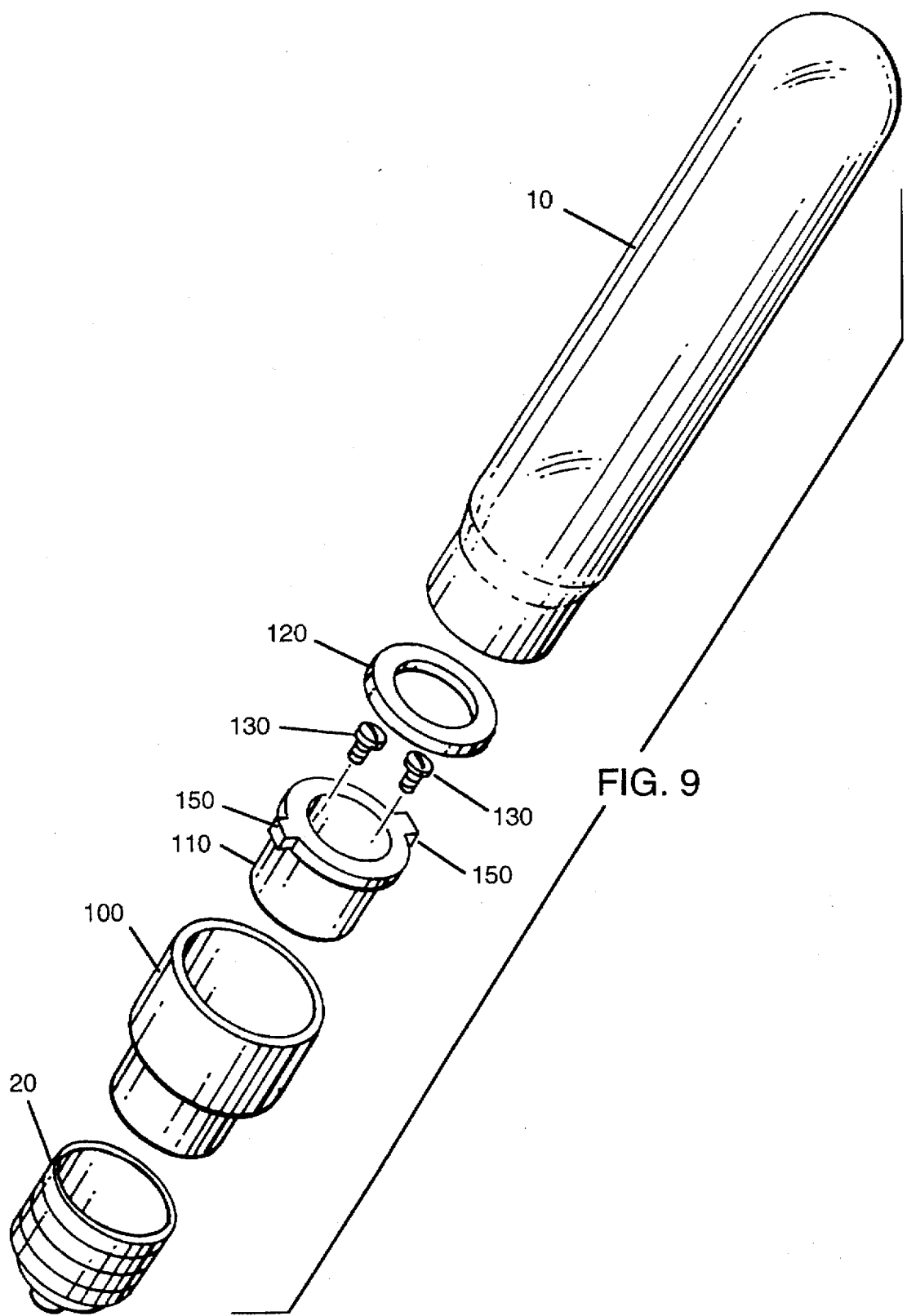
FIG. 9 is an exploded perspective view of the replacement lamp assembly.

Referring to FIG. 9, shown is an exploded view of the replacement solid-state lamp, detailing the principal components of the assembly. The assembly allows for approximately 160 degrees of rotation of the upper structure of the lamp assembly. The replacement lamp can then be rotated to position it optimally so that the LEDs produce the maximum illuminated area.

Two machine screws 130 secure the fixed insert 110 to the candelabra screw lamp base 20. The wires that connect the AC source to the circuit board assembly 90 pass through the central portions of 100, 110 and 120. Frictional retainer 120 is placed intermediate the fixed insert 110 and the glass envelope 10. The rotatable injection molded plastic base 100 is then cemented to the glass envelope 10.

Figure 4:
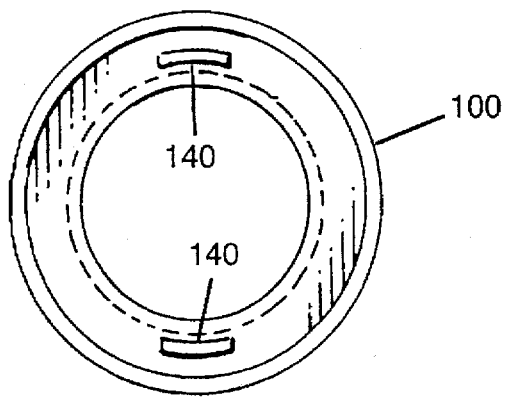
FIG. 4 is the top view of the injection molded plastic base with internal stops that attach to the glass envelope.
Figure 5:
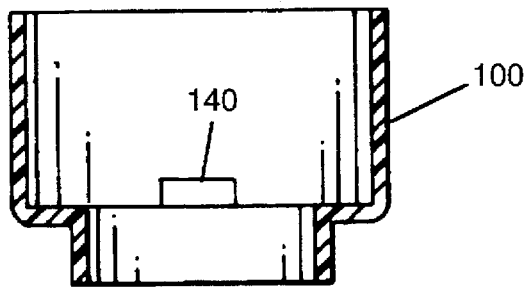
FIG. 5 is a sectional side view of the injection molded plastic base with internal stops that attach to the glass envelope.

FIG. 4 and FIG. 5 show the detailed construction of the rotatable lamp base 100 which is the outer portion of the socket assembly 25. The fixed stops 140 restrict the rotation of insert 110 to approximately 160 degrees. As such, the rotational assembly includes 10, 100, 120 and light stick 90, (or 92) which are free to rotate for manual positioning of the light stick. Of course, the first step is to insert candelabra base 20 tightly into a standard A/C socket. Thereafter, as bulb 10 is manually turned, light stick 90 (or 92) rotates, and the rotative or turn position is maintained by frictional retention between components 120 and 110, the latter being stationary or fixed.

Figure 6:
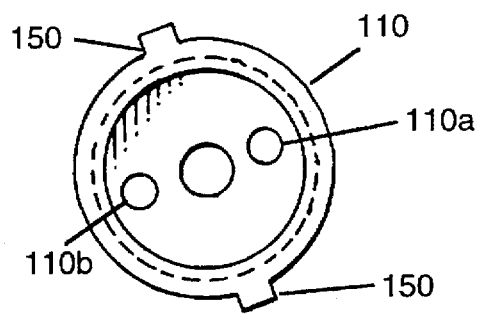
FIG. 6 is the top view of the internally mounted rotatable insert that attaches to the candelabra base. Internal stops provide a limited amount of rotation.
Figure 7:
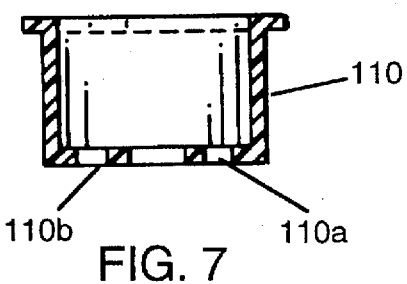
FIG. 7 is a sectional side view of the insert shown in FIG. 6.
Figure 8:
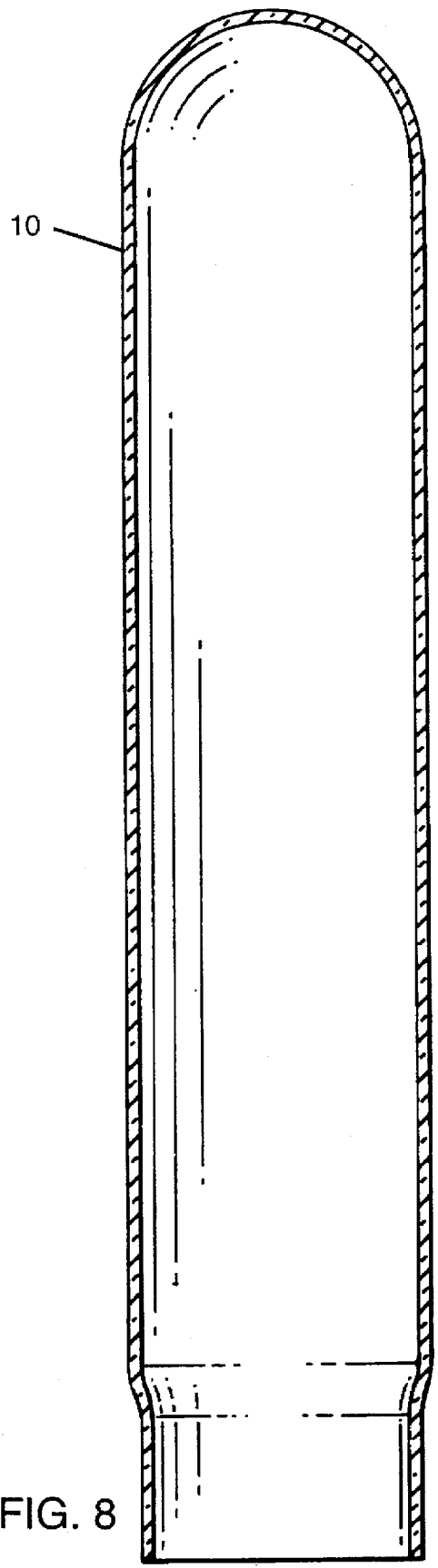
FIG. 8 is a sectional side view of the glass envelope that surrounds the electronic circuitry.

FIG. 6 and FIG. 7 show the detailed construction of the fixed insert 110. The mounting machine screws 130 attach the fixed insert to the candelabra screw base via holes 110a and 110b. Intermediate to the glass housing 10 and the fixed insert 110 is the plastic frictional retainer 120, which maintains the lamp position once it is turned in the desired direction. The assembly is then completed by attaching the power leads to the printed circuit light stick. After the assembly is completed, the glass housing 10 is cemented into the rotatable base 100.

There may be other improvements, modifications and embodiments that will become apparent to one of ordinary skill in the art upon review of this document. As such, these improvements, modifications and embodiments are considered to be within the scope of the invention as described in the claims.

I claim:

1. An LED retrofit lamp for exit signs, comprising:
   a cylindrical glass envelope associated with a screw base, the base adapted for insertion in a standard bulb socket;
   an illumination means having circuitry for connection with an A/C source through a nondissipative voltage dropping element, the illumination means comprising a plurality of LEDs arranged in two serial LED strings, comprising first and second LED strings, each string connected in parallel with the other, enclosed in the glass envelope;
   a rotatable assembly for rotating the illumination means against a frictional contact with the envelope, within a rotating range of less than 160 degrees with reference to the base; and,
   a means for anchoring the illumination means in a desired optimal view, rotative position with reference to the base.

2. The LED retrofit lamp for exit signs described in claim 1, wherein the illumination means further comprises a dual sided printed circuit board assembly having an upper surface and a lower surface, the circuit board having a plurality of embedded semiconductor chips, constructed of an electrically insulating, encapsulating material for maintenance of isolation between the chips; and, the two serial LED strings mounted on both the upper and lower surfaces of the circuit board.

3. The LED retrofit lamp for exit signs according to claim 2, wherein the each LED string is connected in series with a half wave rectifier, such that the first string conducts in the opposite direction of the second string.

4. The LED retrofit lamp for exit signs according to claim 3, wherein the nondissipative voltage dropping element comprises a capacitor connected in series to the LED arrays which are connected in parallel.

5. The LED retrofit lamp for exit signs according to claim 4, further comprising a means for protection against a voltage surge associated with the two LED strings.

6. The LED retrofit lamp for exit signs according to claim 5, wherein the means for protection against a voltage surge comprises a varistor positioned in parallel with the LED strings.

7. The LED retrofit lamp for exit signs according to claim 6, wherein the rotatable assembly for rotating the illumination means comprises the glass envelope fixed to a molded base, a plastic insert secured to the screw base by fasteners, and a frictional retainer positioned intermediate the insert and the glass envelope for the frictional contact with, and retention of, the glass envelope and enclosed illumination means in a desired rotative position.

8. An improved solid-state lamp, comprising:
   a glass envelope associated with a screw base, the base adapted for insertion in a standard bulb socket;
   an illumination means having circuitry for connection with an A/C source, the illumination means enclosed in the glass envelope;
   a rotatable assembly for rotating the illumination means with reference to the base;
   a means for anchoring the illumination means in a desired optimal view, rotative position with reference to the base;
   wherein the illumination means further comprises a dual sided printed circuit board assembly having an upper surface and a lower surface and a plurality of serially connected LEDs mounted on both the upper and lower surfaces of the circuit board;
   wherein the plurality of LEDs comprises first and second serial arrays of LEDs connected in parallel, each array connected in series with a half wave rectifier, such that the first array conducts in the opposite direction of the second array;
   further comprising a means for limiting current connected in series to the LED arrays which are connected in parallel;
   wherein the means for limiting current comprises a capacitor;
   wherein the means for limiting current further comprises a varistor positioned in parallel with the LED arrays;
   wherein the rotatable assembly for rotating the illumination means comprises the glass envelope fixed to a molded base, a plastic insert secured to the screw base by fasteners, and a frictional retainer positioned intermediate the insert and the glass envelope for frictional contact with, and retention of, the glass envelope and enclosed illumination means in a desired rotative position.

9. An improved solid-state lamp according to claim 8, wherein the means for anchoring the illumination means in a desired optimal view, rotative position with reference to the base comprises the plastic insert which anchors the rotatable assembly and glass envelope to the screw base, and the insert having a pair of tabs, which are fixed stops, extending upward from the rotatable assembly to mate with the plastic insert and restrict a rotation of, and to anchor, the insert within a rotating range of less than 160 degrees.

10. An improved solid-state lamp described in claim 9, wherein the first and second serial arrays of LEDs each comprises 12 LEDs connected in series with a half wave rectifier and 12 LEDs are mounted on each surface of the circuit board to form a light stick comprising a total of 24 LEDs.

11. An improved solid-state lamp according to claim 10, further comprising a plurality of semiconductor chips embedded in the circuit board.

12. An improved solid-state lamp according to claim 11, wherein the dual sided printed circuit board assembly is comprised of an electrically insulating encapsulating material for maintenance of electronic isolation between the chips.

13. An improved solid-state lamp according to claim 12, wherein the circuit board comprises two pieces to expedite wave soldering LEDs on a single surface of each piece, the board pieces adhered together to form a light stick.

14. An improved solid-state lamp according to claim 8, further comprising a current limiting means in series with said strings.

15. An improved solid-state lamp according to claim 14, wherein said current limiting means comprises an impedance means.

16. The improved solid-state lamp according to claim 15, wherein said impedance means comprises an inductor.

17. The improved solid-state lamp according to claim 15, wherein said impedance means comprises a capacitor.

18. An improved solid state-lamp, comprising:
an illuminating means communicating with an A/C power source;
the illuminating means comprising a first string of serial LEDs connected in series with a half wave rectifier to the A/C source for conducting current in a first direction; a second string of serial LEDs connected in series with a half wave rectifier to the A/C source for conducting current in a second direction opposite to the first current direction of the first string; the first string and second string connected in parallel; a nondissipative voltage dropping element positioned between the A/C source and the first and second LED strings; and, both strings of serial LEDs connected across the power source, whereby a positive half cycle of A/C voltage provides conduction with consequent illumination of the first string and a nonconductive state in the second string; and, an alternate negative half cycle of A/C voltage provides conduction with consequent illumination of the second string and a nonconductive state in the first string, for constant illumination of the lamp.

19. An improved solid-state lamp according to claim 18, wherein the nondissipative voltage dropping element comprises a capacitor.

20. An improved solid-state lamp according to claim 19, further comprising a means for protection against transient voltage surges connected in parallel with the first and second LED strings.

21. An improved solid-state lamp according to claim 26, wherein the means for protection comprises a varistor.

22. An improved solid-state lamp according to claim 21, further comprising a tube lock adapting the lamp to rotate to optimally position the LEDs and produce the maximum illuminated area.

23. An improved solid-state lamp according to claim 22, wherein the LED strings are mounted on a circuit board with semiconductor chips embedded therein, the board formed of two pieces adhered together, to form a light stick.

24. Improvements for an LED lamp for use in exit signs as a retrofittable replacement lamp in a standard incandescent bulb socket and powered by standard A/C voltage mounted in a glass envelope, said improvements embodied by said lamp comprising two strings of serially connected LEDs, that are oppositely directed and mounted on opposite sides of a dual sided printed circuit board, the strings connected in parallel and each string in series with a half-wave rectifier forward of a parallel voltage suppressing means that is also forward of a series connected, nondissipative current limiting means, having a screw base connected with a rotatable insert, and a plastic base adhered to the envelope and in frictional contact with a retainer positioned between the envelope and said insert, said lamp adapted for rotation to an optimum position to produce a maximum constant illumination area.

25. The improvements for an LED lamp according to claim 24 above, wherein said nondissipative current limiting means comprises a reactive impedance element.

26. The improvements for an LED lamp as in claim 25, further comprising said insert attached to the base by fasteners.

27. The improvements for an LED lamp of claim 26, further comprising a pair of tabs positioned on said plastic base to restrict a rotation of the insert within a range from 0 to 160 degrees.

* * * * *